US007733766B2

(12) United States Patent
Ozer et al.

(10) Patent No.: US 7,733,766 B2
(45) Date of Patent: Jun. 8, 2010

(54) SYSTEM AND METHOD FOR PROVIDING QUALITY OF SERVICE PROVISIONS AND CONGESTION CONTROL IN A WIRELESS COMMUNICATION NETWORK

(75) Inventors: Sebnem Z. Ozer, Altamonte Springs, FL (US); Surong Zeng, Altamonte Springs, FL (US); Charles R. Barker, Jr., Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 1041 days.

(21) Appl. No.: 11/260,826

(22) Filed: Oct. 27, 2005

(65) Prior Publication Data

US 2006/0087974 A1   Apr. 27, 2006

Related U.S. Application Data

(60) Provisional application No. 60/622,170, filed on Oct. 27, 2004.

(51) Int. Cl.
*G01R 31/08* (2006.01)
(52) U.S. Cl. ...................................... 370/216; 370/242
(58) Field of Classification Search ......... 370/216–228, 370/310.2
See application file for complete search history.

(56) References Cited

U.S. PATENT DOCUMENTS

| 5,943,322 | A | 8/1999 | Mayor |
| 6,657,963 | B1 * | 12/2003 | Paquette et al. ............. 370/236 |
| 6,807,165 | B2 | 10/2004 | Belcea |
| 6,873,839 | B2 | 3/2005 | Stanforth |
| 7,162,250 | B2 * | 1/2007 | Misra ......................... 455/453 |
| 7,400,901 | B2 * | 7/2008 | Kostic et al. ................. 455/525 |
| 2002/0058502 | A1 | 5/2002 | Stanforth |

(Continued)

FOREIGN PATENT DOCUMENTS

WO       02100053 A1    12/2002

OTHER PUBLICATIONS

IEEE P802.11e/D10.0, Sep. 2004: Amendment 7: Medium Access Control (MAC) Quality of Service (QoS) Enhancements Specifically, Sections 6.1.1; 7.1.3.5; 7.2.3.1; 7.3.2.14; 9.1.3.1; 9.9.1.

(Continued)

*Primary Examiner*—Phuc Tran
(74) *Attorney, Agent, or Firm*—Randi L. Karpinia; Joseph Buczynski

(57) ABSTRACT

A system and method for providing a traffic control scheme for QoS provision and congestion control across multiple interfaces of wireless nodes (102, 106 and 107), such as wireless access points (107 and 106), communicating in a wireless multihopping communication network (100). The nodes (102, 106 and 107) can include multiple transceivers. The system and method detects bottleneck interfaces in these nodes (102,106, 107) to control the traffic along the path of the corresponding traffic flow. Different measurements and cross-layer feedback are used to differentiate the cause of the congestion, such as wireless link quality degradation due to fading or degradation due to congestion in a shared medium. The nodes (102, 106, 107) inform each other on the status of their congestion level. High and low level signaling and interruption mechanisms are used to control the interfaces of the congested node (102, 106 or 107) to adjust traffic flow and alleviate the congestion.

13 Claims, 4 Drawing Sheets

U.S. PATENT DOCUMENTS

2002/0186657 A1* 12/2002 Jain et al. .................. 370/235

OTHER PUBLICATIONS

IEEE 802.11-03-504r6, IEEE P802.11 Wireless LANs, Wireless Multimedia Enhancements, Mar. 2004 Specifically, Sections 2.1.6; 2.2.2-2.2.4; 3.2; 3.3-3.4.

Korean Patent Office, Office Action received Dec. 18, 2008, 3 pages.

PCT/US05/38880, PCT Search Report and Written Opinion, mailed Nov. 22, 2006, 8 pages.

PCT/US2005/038880, PCT Preliminary Report on Patentability, mailed May 10, 2007, 5 pages.

Chinese Patent Office, Chinese Application No. 200580036859.7, Office Action [translated], May 30, 2008, 10 pages.

Chinese Patent Office, Chinese Application No. 200580036859.7, Office Action [translated], Decision on Rejection, Mar. 26, 2009, 14 pages.

Korean Patent Office, Korean Application No. 10-2007-7011889, Office Action [translated], Notice of Final Rejection, email dated May 27, 2009, 3 pages.

* cited by examiner

SYSTEM AND METHOD FOR PROVIDING QUALITY OF SERVICE PROVISIONS AND CONGESTION CONTROL IN A WIRELESS COMMUNICATION NETWORK

This application claims the benefit of U.S. Provisional Application No. 60/622,170, filed Oct. 27, 2004, the entire content being incorporated herein by reference.

FIELD OF THE INVENTION

The present invention relates to wireless communication networks and, more particularly, to a traffic control scheme that can be applied to multiple transceiver devices in wireless multihopping networks to provide quality of service (QoS) provisions and congestion control across multiple interfaces of the devices.

BACKGROUND

In recent years, a type of mobile communications network known as an "ad-hoc" network has been developed for use by the military. In this type of network, each mobile node is capable of operating as a base station or router for other mobile nodes, thereby eliminating the need for a fixed infrastructure of base stations. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

More sophisticated ad-hoc networks are also being developed which, in addition to enabling mobile nodes to communicate with each other as in a conventional ad-hoc network, further enable the mobile nodes to access a fixed network and communicate with other mobile nodes, such as those on the public switched telephone network (PSTN), and on other networks, such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29,2001, now U.S. Pat. No. 7,072,650, granted on Jul. 04, 2006, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference.

As can be appreciated by one skilled in the art, communication between nodes, however, is often subject to errors due to interference, multipath and fading effects, and collisions. Avoidance of many such errors can be achieved using a control-signal handshake between transmitting and receiving nodes. A communication protocol, such as multiple access with collision avoidance (MACA), uses such a handshake technique between nodes consisting of a request-to-send (RTS) control packet sent from a source node to a destination node which in response, replies with a clear-to-send (CTS) control packet. A multiple access with collision avoidance for wireless (MACAW) algorithm typically handles ARQ retransmissions for corrections of such errors by repeating the whole request-to-send/clear-to-send (RTS/CTS) channel access sequence. In addition, MACAW introduces the use of data-sending (DS) messages to form RTS-CTS-DS-DATA-ACK message exchange and a new backoff algorithm (with the "DATA" being the data and "ACK" being and acknowledgement message).

The Institute of Electrical and Electronics Engineers (IEEE) 802.11 Standard has a mandatory access method, referred to as a distributed coordination function (DCF), which is a form of carrier sense multiple access with collision avoidance (CSMA/CA) that implements both carrier sensing and virtual (RTS-CTS exchange) carrier sensing with acknowledgment messages to improve reliability. As an optional access method, the IEEE 802.11 Standard defines a method known as a point coordination function (PCF), which enables the transmission of time-sensitive information. With PCF, a point coordinator within the access point (AP) controls which stations can transmit during any given period of time. Within a time period called the contention free period, the point coordinator steps through a list of the stations operating in PCF mode and polls them one at a time.

In addition, the media access control (MAC) according to the IEEE 802.11e Standard provides QoS enhancements. That is, the 802.11e Standard QoS technique employs a coordination function called hybrid coordination function (HCF) used only in a QoS enhanced basic service set (QBSS). The HCF has two modes of operation: enhanced distributed channel access (EDCA) and HCF controlled channel access (HCCA). As can be appreciated by one skilled in the art, EDCA is a contention-based channel access function that operates concurrently with HCCA based on a polling mechanism, which is controlled by the hybrid coordinator (HC). The HC is co-located with the QAP (QoS AP), and both types of access (EDCA and HCCA) enhance or extend functionality of the original access methods DCF and PCF. EDCA has been designed for support of prioritized traffic similar to DiffServ (Differentiated Services), which is a protocol for specifying and controlling network traffic by class so that certain types of traffic get precedence, whereas HCCA supports parameterized traffic similar to IntServ (Integrated Services), which is a protocol that attempts to guarantee QoS on networks.

The IEEE 802.11 Standard further introduces the concept of transmission opportunity (TXOP) that is a bounded time interval in which the QSTA (QoS station) is allowed to transmit a series of frames. A TXOP is defined by the start time and a maximum duration. If a TXOP is obtained using the contention-based channel access, it is called an EDCA-TXOP. If a TXOP is granted through HCCA, it is called a HCCA (polled) TXOP. Furthermore, the IEEE 802.11e Standard defines different acknowledgement (ACK) policies between nodes.

Other MAC protocols, such as TDMA based systems, have been proposed for ad-hoc wireless systems to support guaranteed QoS provision. Due to lack of a central controller and high network dynamics, end-to-end reservation schemes or admission control schemes, however, are often not feasible to implement. On the other hand, hop-by-hop channel reservation and traffic control systems may fail to work efficiently if appropriate actions are not taken along the path of the traffic flow. The problem gets more complicated when there are multiple options for MAC protocols along a path since the devices may have multiple transceivers.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
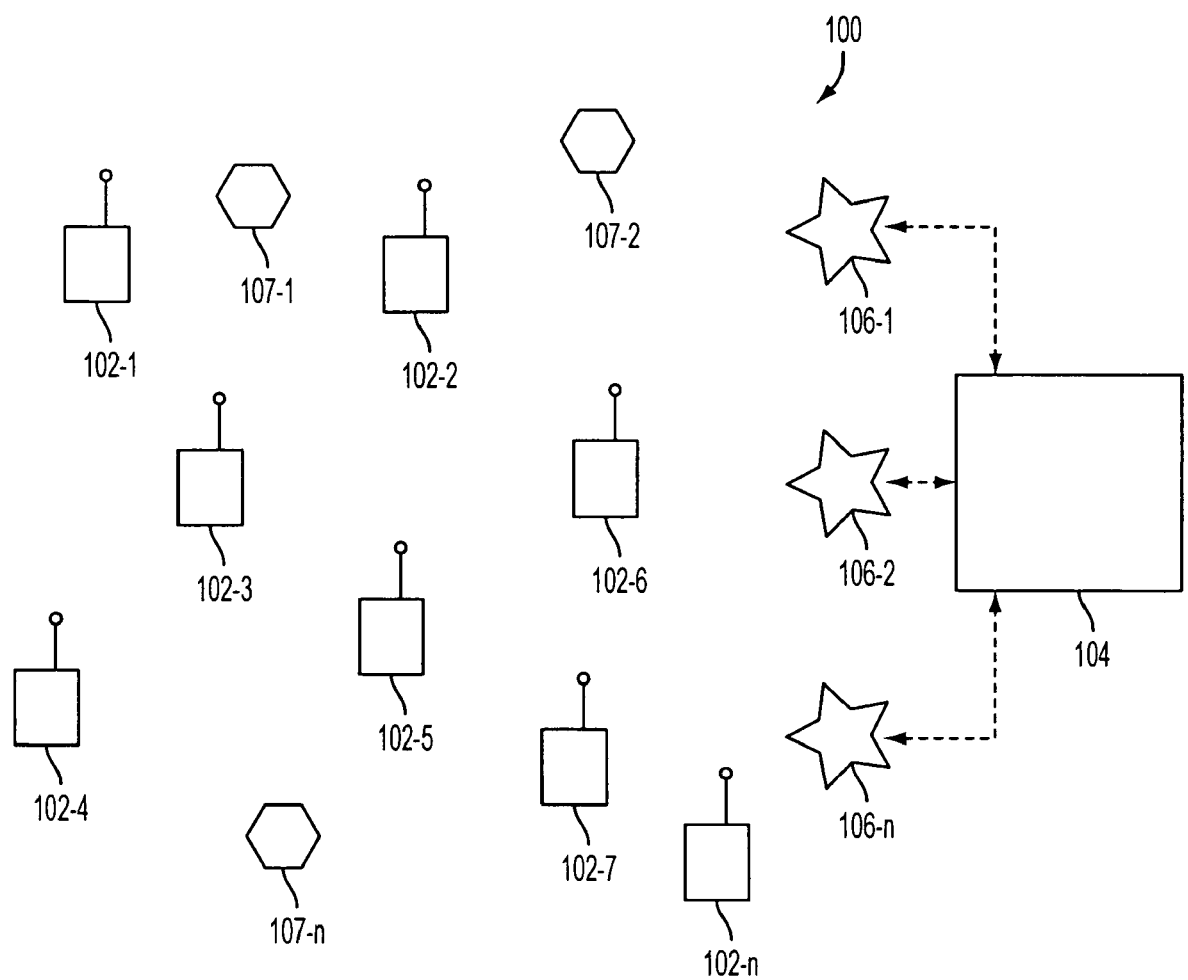
FIG. 1 is a block diagram of an example ad-hoc packet switched wireless communications network including a plurality of nodes in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components for providing QoS provisions and congestion control across multiple interfaces of multiple transceiver devices in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for providing QoS provisions and congestion control across multiple interfaces of multiple transceiver devices in a wireless communication network. The non-processor circuits may include, but are not limited to, a radio receiver, a radio transmitter, signal drivers, clock circuits, power source circuits, and user input devices. As such, these functions may be interpreted as steps of a method for providing QoS provisions and congestion control across multiple interfaces of multiple transceiver devices in a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As will now be discussed in detail, the present invention provides a system and method that can implement channel access and traffic control mechanisms by providing coordination and translation between multiple interfaces in devices in a wireless multihopping communication network, to thus provide QoS provisions and congestion control. The system and method can detect a bottleneck interface in wireless devices having multiple transceivers to control the traffic along the path of the corresponding traffic flow in mobile ad-hoc networks. The system and method can also differentiate the causes of congestion causes, for example, wireless link quality degradation due to fading versus degradation due to congestion in the shared medium, by evaluating different measurements and cross-layer feedback, and can correct the packet routing accordingly. The wireless devices can inform each other on the status of their congestion level, and the system and method can therefore create a unified metric to detect congestion. High and low level signaling and interruption mechanisms can be used to control the interfaces and transceivers of the congested device to alleviate the congestion, for example, by increasing inter-frame delay on any local transceivers contributing to the congestion.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of APs 106-1, 106-2, ...106-n (referred to generally as nodes 106, APs 106 or intelligent APs (TAPs) 106), for providing nodes 102 with access to the fixed network 104. The fixed network 104 can include, for example, a core local access network (LAN), and a plurality of servers and gateway routers to provide network nodes with access to other networks, such as other ad-hoc networks, the PSTN and the Internet. The network 100 may also include a plurality of fixed routers 107-1 through 107-n (referred to generally as nodes 107 or routers 107) for routing data packets between other nodes 102, 106 or 107. It is noted that for purposes of this discussion, the nodes discussed above can be collectively referred to as "nodes 102, 106 and 107", or simply "nodes" or "terminals". As can be appreciated by one skilled in the art, the nodes 102, 106 and 107 are capable of communicating with each other directly, or via one or more other nodes operating as routers for packets being sent between nodes, as described in U.S. Pat. No. 5,943,322 to Mayor, and in U.S. Pat. No. 7,072,650 and U.S. Pat. No. 6,807,165 and 6,873,839, referenced above. In the IEEE 802.11 networks, the nodes 106 and 107 communicate with the nodes 102 through their basic service set (BSS) interface while they communicate with each other through their wireless distribution system (WDS) interface. Furthermore, each node may have multiple radios for their interfaces. The example can be extended for radios and systems other than IEEE 802.11 networks.

Figure 2:
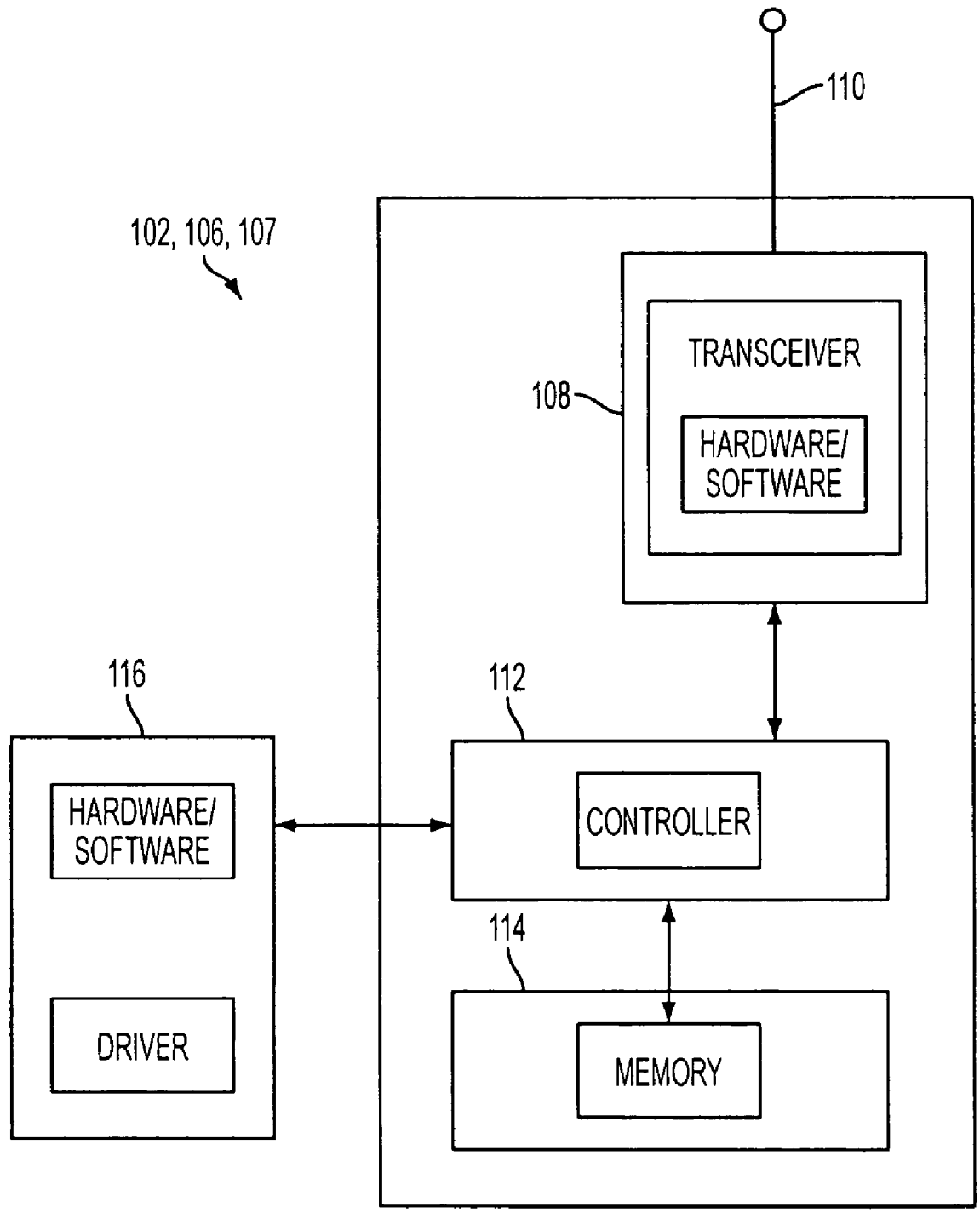
FIG. 2 is a block diagram illustrating an example of a mobile node employed in the network shown in FIG. 1.

As shown in FIG. 2, each node 102, 106 and 107 includes at least one transceiver 108 which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node routing and update information.

Each node 102, 106 and 107 further includes a memory 114, such as a random access memory (RAM), that is capable of storing, among other things, routing information pertaining to itself and other nodes in the network. The nodes 102, 106 and 107 periodically exchange respective routing information, referred to as routing advertisements, with each other via a broadcasting mechanism at various intervals, such as when a new node enters the network, or when existing nodes in the network move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software protocols to perform automatic repeat request (ARQ) functions and MAC, including a local scheduling algorithm provided to solve fairness and service differentiation problems as set forth in greater detail below.

In the network 100 described above with regard to FIG. 1, each node 102, 106 and 107 may have multiple transceivers (radios) 108. Certain nodes, such as nodes 106 and 107, also may have QAP functionalities with QBSS and WDS interfaces, and are referred to as QAP nodes 106 and 107. A QAP node 106 and 107 can have traffic to and from its QBSS and WDS interfaces. Furthermore, QAP 106 may have traffic coming from the wired backbone while node 107 may have traffic coming from the host stack. The aggregated traffic load of the QAP node 107 should include the traffic to be forwarded and received by the QAP node 107, and the queue size of the QAP node 107 can be computed by the traffic information distributed from its QBSS and WDS interfaces. Also, the controller 112, for example, of a QAP node 107 can compute the number of packets per next hop (e.g., node 107) and per traffic identifier (TID), and the controller 112 can control the transceiver 108 to transmit this information to the next hop (e.g., a node 107 and/or 106) identified in the data header of the packet traffic or to transmit a special transmission beacon including this information. It is noted that the next hop need not be a node 102, 106 or 107, but can be the other interface or transceiver 108 in the QAP node 107. Furthermore, it is noted that the controller 112 of a node, such as QAP node 107, along with the associated hardware and software can perform the operations described herein that pertain to a particular node.

Figure 3:
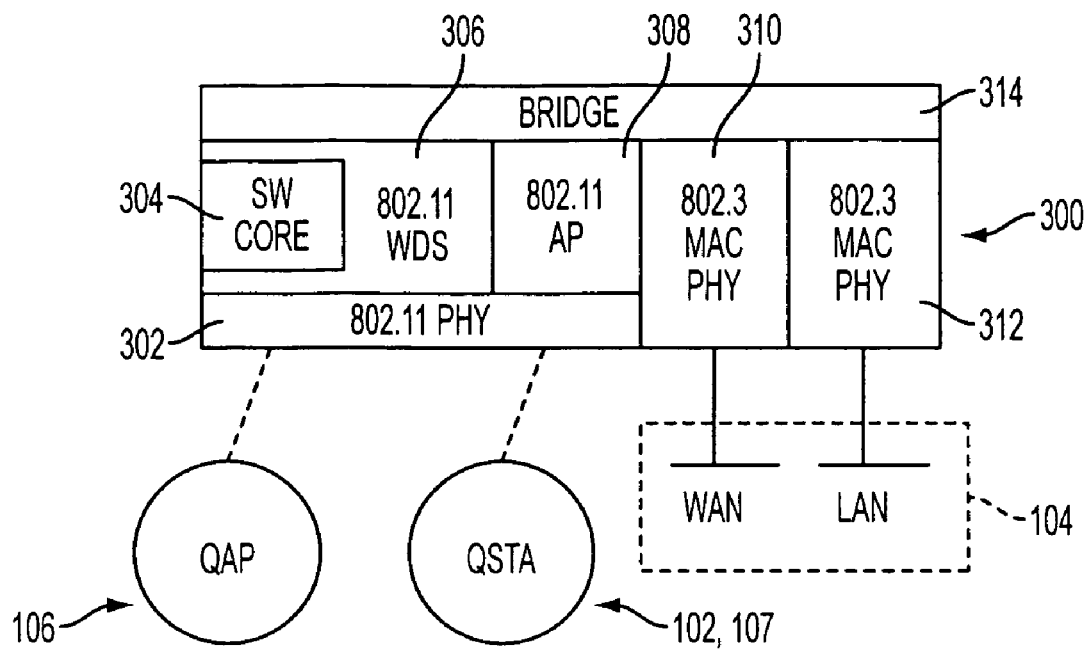
FIG. 3 is a conceptual block diagram illustrating an example of the relationship between components of an AP in the network shown in FIG. 1 functioning as a QAP having multiple interfaces, and communication between the AP and a node in the network functioning as a QSTA and another AP according to an embodiment of the present invention.

FIG. 3 is a conceptual block diagram illustrating an example of the relationship between components of an IAP 106 in the network 100 shown in FIG. 1 functioning as a QAP node 106 having multiple interfaces according to an embodiment of the present invention. The arrangement 300 can be embodied in the components of the IAP 106, such as the transceiver 108, controller 112, memory 114 and the related hardware and software. As illustrated, the arrangement 300 employs a physical (PHY) layer 302, a software (SW) core 304, a WDS interface 306, an AP interface 308, MAC layers 310 and 312 that include their own respective physical layers, and a bridge 314 between the components, according to IEEE Standard 802.11. As indicated, in particular, in this example, the same PHY layer 302 is used as the interface for QBSS for communications between QAP 106 and its associated QSTAs 102, and the interface for the WDS 306 for communication between QAPs 106 and 107.

Figure 4:
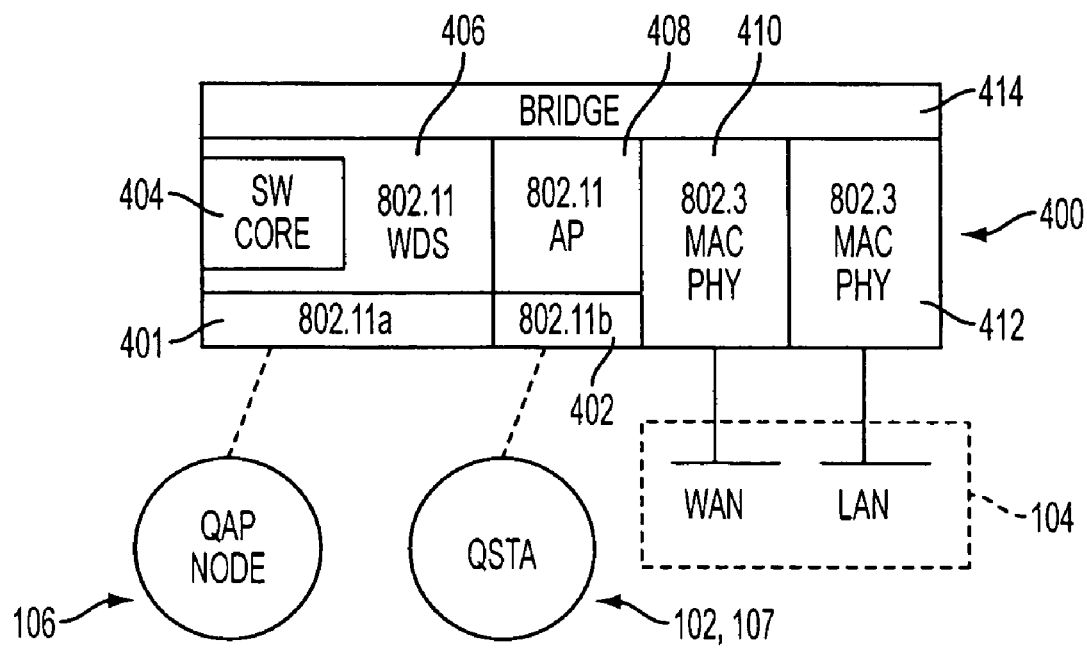
FIG. 4 is a conceptual block diagram illustrating an example of the relationship between components of an AP in the network shown in FIG. 1 functioning as a QAP having multiple interfaces and multiple transceivers, and communication between the AP and a node in the network functioning as a QSTA and another AP according to an embodiment of the present invention.

FIG. 4 is a conceptual block diagram illustrating an example of the relationship between components of an IAP 106 in the network 100 shown in FIG. 1 functioning as a QAP node 106 having multiple interfaces and multiple transceivers (radios) according to an embodiment of the present invention. As illustrated, the arrangement 400 is similar to arrangement 300 in that arrangement 400 employs a SW core 404, a WDS interface 406, an AP interface 408, MAC layers 410 and 412, and a bridge 314 between the components, according to IEEE Standard 802.11. Unlike the arrangement shown in FIG. 3, however, this arrangement employs a PHY layer 402-1 as the interface for QBSS for communications between QAP 106 and its associated QSTAs 102, and a different PHY layer 402-1 as the interface for the WDS 306 for communication between QAPs 106 and 107. Nevertheless, the embodiments of the present invention described herein can operate similarly with either arrangement shown in FIGS. 3 and 4.

Figure 5:
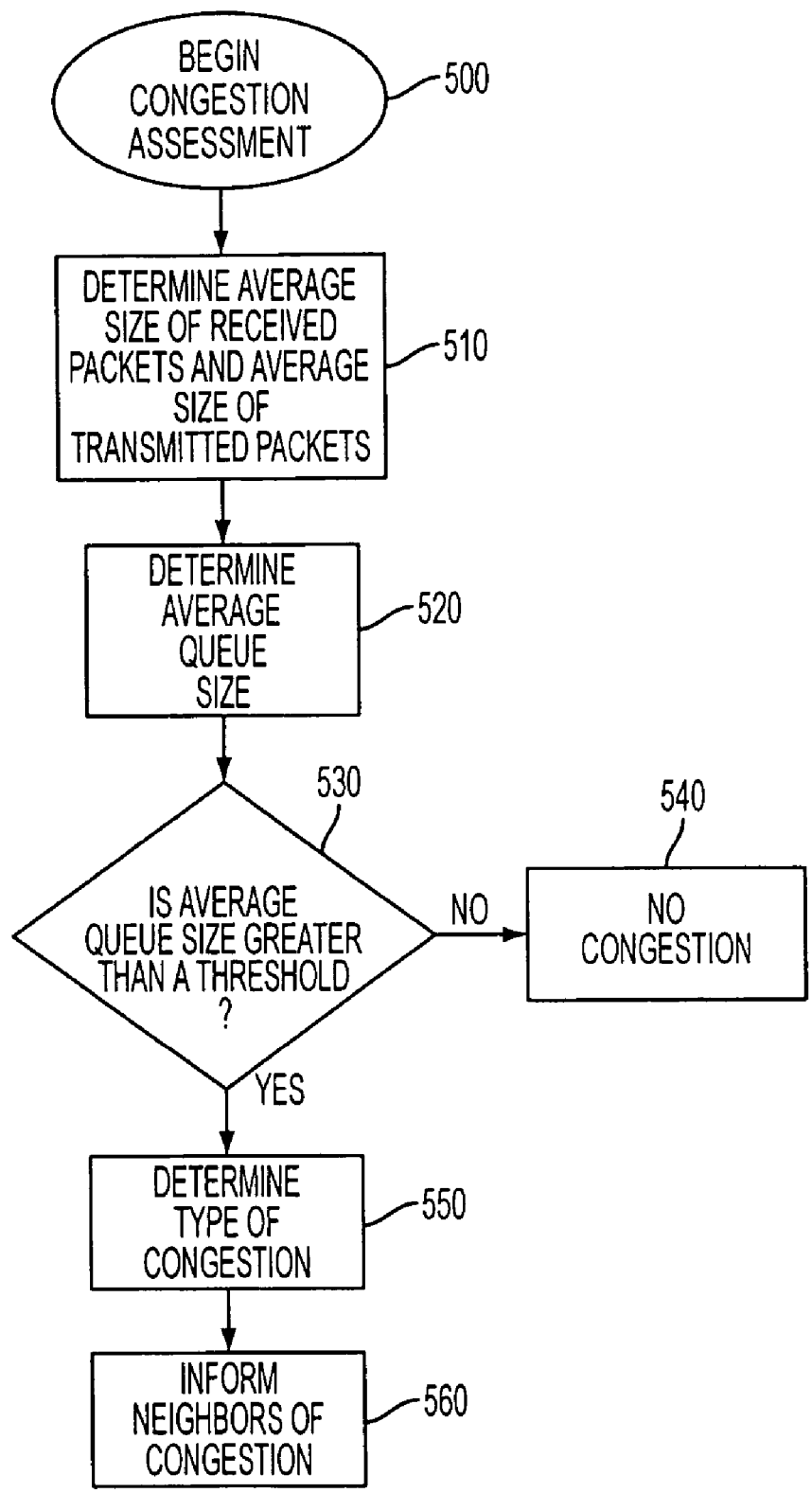
FIG. 5 is a flowchart illustrating an example of operations performed by a QAP for detecting and responding to congestion in accordance with an embodiment of the present invention.

As will now be described with regard to the flowchart of FIG. 5, in order to assess congestion beginning in step 500, each QAP node 107 can maintain a moving average of queue size and priority levels for the traffic being received from the QSTAs (such as other nodes 102) and the WDS interface (such as other nodes 107 and/or 106). The traffic from QBSS and WDS can be weighted with different priorities in order to be able to differentiate the traffic from different interfaces. For instance, this may help to reduce forwarding traffic in WDS when QBSS has high traffic volume. In step 510, the moving average of the size of the traffic received from nodes 102, 106 or 107 that can be referred to as "precursor nodes," can be computed in accordance with the following equation:

$$\text{Ave\_rcv\_size}(t) = \lambda^{\Delta t}\text{Ave\_rcv\_size}(t-\Delta t) + (1-\lambda^{\Delta t})\text{rcv\_size}(t),$$

where Ave_rcv_size(t) represents the average size of the received packets at a particular time "t", $\Delta t$ is the time that has elapsed since the last time that the Ave_rcv_size value was updated, and rcv_size(t) is the "queue size" reported in the QoS Control Field of data packets received from QSTAs such as nodes 102, or from precursor nodes (e.g., other QAP nodes 107 and/or 106). The variable λ represents the forgetting factor that is used to give less weight to an older reported queue size represented by rcv_size(t). Similarly, a QAP node 107 in step 510 computes the average size Ave_tx_size of the packets destined to QSTAs, such as nodes 102, and to other QAP nodes 107 an/or 106.

The service time of a QAP node 107 is determined by the estimated traffic that it receives and forwards. The aggregated service time can be estimated by aggregating these average received and transmitted packet size values as an Ave_q_size in step 520. The total traffic load of a QAP node 107 is thus the summation of the traffic that the QAP node 107 receives from its QBSS interfaces and precursor nodes 107 and/or 106 in the WDS (e.g., network 100) and sends to its QBSS interfaces and next hops nodes 107 and/or 106 in the WDS. The Ave_q_size at a time "t" can be calculated as follows:

$$Ave\_q\_size(t) = \beta Ave\_tx\_size(t) + (1-\beta) Ave\_rcv\_size(t),$$

where Ave_tx_size(t) is the average transmission queue size at time "t" and Ave_rcv_size(t) is the average receive queue size at time "t" that were calculated as described above. The transmission and receive queue sizes can be weighted based on their priority levels, deadlines and other related attributes, using a weighting factor β, which can have a value $1 \geq \beta$. Congestion can therefore be detected in step 530 by determining if the average queue size is greater than a threshold value as indicated by the following equation:

$$Ave\_q\_size(t) > q\_thres$$

where the threshold value q_thres can be set based on the actual size of the queue of the QAP node 107. If the calculated value is not greater than the threshold value, there is no congestion as indicated in step 540. If the calculated value is greater than the threshold value, this QAP node 107 is considered to be congested. Other measurements and statistics may be used to mark a node as congested. For instance, a fairness index based on the node's and its neighborhood channel sharing time (ratio of CCA/NAV values to the node's transmission time) may be used as an additional measure to trigger slow down process.

Once a QAP node 107 detects that it is congested, the QAP node 107 determines the cause of congestion in step 550. The congestion may be due to characteristics of a specific link, or due to the shared medium load due to transmissions by other nodes in the neighborhood accessing the transmission medium. The congestion due to link characteristics may occur when the link quality is bad between a precursor QAP 107 and the QAP node 107, or between the QAP 107 and non-AP QSTAs (e.g., nodes 102) operating in the QBSS. Congestion also may occur when the next hop node 102, 106 or 107 is busy receiving traffic from and forwarding traffic to other QAP nodes 107, or has a busy neighborhood and/or has high traffic load within its QBSS. Also, as stated above, the next hop may be the other interface or transceiver 108 in the QAP node 107, and congestion may thus occur internally in the QAP node 107. For example, congestion due to shared medium load may occur when the congested QAP node 107 is busy receiving traffic from other QAP nodes 107, and has a busy neighborhood and/or has high traffic load within its QBSS.

To differentiate the cause of congestion, the feedback on transmission failures and measurements related to channel activity levels, such as clear channel assessment (CCA) and network allocation vector (NAV) busy times in a network 100 complying with IEEE Standard 802.11, are analyzed. If the channel access rate of the QAP node 107 is reduced due to high channel activity in the neighborhood of the QAP node 106, the traffic load in the shared medium is the cause of the congestion. On the other hand, if the measurements show that channel activity is low but the QAP node 107 has high number of data transmission failures, this indicates a problem with the corresponding links between itself and the next hop nodes 102, 106 or 107.

Once a QAP node 107 detects that it is congested, the QAP node 107 can request that the nodes 102, 106 or 107 that cause the congestion reduce their transmission rate. For example, in step 560 the congested QAP node 107 can distributed information pertaining to its identity and its congestion by transmitting beacons as discussed above, or by including this information in management frames or packets that the QAP node 107 transmits. For example, the information such as the calculated ave_q_size can be distributed as an information element (IE) in the management frames, and the management frames can include congestion_flag field that can be used to inform nodes 106 or 107 within a certain range (e.g., within two hops) about the congestion (e.g., the flag can be set to a "1" to indicate congestion). The QAP node 107 should transmit the beacons or management frames periodically, and at least at the time when the congestion condition changes, that is, when the congestion_flag field changes from a "1" (congestion) to a "0" (no congestion), or vice-versa. Transmission of the IE should be repeated for a number of consecutive beacons or management frames to increase the reliability of reception by other nodes 106 and 107. The controller 112, for example, of a node 106 or 107 that receives the beacon or management frame checks the status of the congestion_flag field and the value of the ave_q_size, and can control the transceiver 108 of that node to reduce its traffic. A more details example of this process that can occur in a network 100 that complies with IEEE Standard the 802.11 is described below.

A QAP node 107 that determines that it is congested changes its QBSS EDCA parameter set, although the QAP node 107 may choose not to change its own EDCA parameter. The QAP node 107 transmits its updated parameters in, for example, management frames or beacon transmissions as described above. Any neighbor QAP node 107, or other neighbor node 107 or 106, that receives a beacon or management frame indicating that a neighboring QAP node 107 is congested, adjusts its own EDCA parameter and thus reduce its transmission rate. The neighbor node 106 or 107 also reduces its QBSS transmission, and transmits a beacon or management frame with the congestion_flag field set to "1", indicating congestion. These transmissions can thus enable the nodes 106 and 107 to create a unified metric to detect congestion. In addition, any QAP node 107, or 106, that is a precursor node of the congested QAP node 107 and receives the beacon or management frame from the congested QAP node 107 also lowers the access category of the packet traffic to be sent to the congested QAP node 107, which can be a next hop along the path to a destination, if the number of packets to be transmitted is high. It is noted that the congested QAP node 107 can alternatively unicast a management frame with a congestion IE (e.g., a congestion_flag field and ave_q_size) to the corresponding precursor nodes.

Furthermore, any QAP node 107, or 106, that is a next hop node of the congested QAP node 107 and receives the beacon or management frame from the congested QAP node 107 checks the value of the queue size in the information received in the beacon or management frame. If the value of the queue size is higher than a predetermined threshold, that next hop node sets the value of its average queue size (ave_q_size) higher than the threshold (q_thres). In addition, any QAP node 106 or 107 that receives a beacon or management frame with the congestion_flag field set to "1" but with the ave_q_size value lower than the q_thresh reduces the transmission of its traffic that is to be sent to the QAP node 107 that transmitted the beacon or management frame (i.e., the congested QAP node 107 is within the two-hop neighborhood). This is achieved by lowering the access category of the traffic for this next hop node. The traffic sent by a precursor node of the congested QAP node 107 can also be reduced if the cause of the congestion is not busy neighborhood but rather, a deficiency in the quality of the link used to forward the traffic from that precursor node to the congested QAP node 107.

As discussed above, when the conditions improve, the congested QAP node 107 should transition to the default EDCA table state (i.e., no congestion) and should inform other QAP nodes 106 and other nodes 102 and 107 in any of the manners described above, such as by transmitting beacons or management frames. The QAP node 107 no longer having congestion transmits the default EDCA table to be distributed for the QBSS, and transmit the updated traffic control IE that can be distributed, for example, in the beacon transmissions. Also, if neighboring nodes 106 and 107 do not receive a beacon or management frame from the congested QAP 107 including information that the value of the ave_q_size is greater than the threshold value q_thres within a time interval, or if a beacon or management frame is received and value of the ave_q_size is smaller than the threshold value q_thres, those nodes 106 and 107 transitions to the default EDCA state. In this case, those nodes 106 and 107 use the default QAP EDCA parameter sets.

It should also be noted that if the next hop, or the precursor, is another interface or transceiver in the same device (i.e., in one QAP node 107), that QAP node 107 may distribute the congestion related information through the MAC layers (e.g., layers 310 and 312 in FIG. 3 and layers 410 and 412 in FIG. 4). In this event, the SW core 304 or 404 can detect congestion in the different interfaces and can take appropriate action to slow down the precursor interface. For this purpose, the SW core 304 or 404 can send a special congestion warning message to the precursor interface that distributes the congestion message to its precursor QAP nodes 106 or 107, or QBSS that sends traffic to this interface.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for responding to congestion in a wireless communication network, the wireless network comprising a plurality of nodes and at least one access point operating to provide at least one of the nodes with access to another network, the method comprising:
   operating an access point to:
      evaluate an amount of traffic that the access point is receiving and an amount of traffic that the access point is transmitting;
      determining whether congestion exists at the access point based on the evaluated amounts of received and transmitted traffic;
      when the access point determines that congestion exists, operating the access point to determine a source and a reason for the congestion and to transmit a message including the source and the reason for the congestion; and
   operating those of the nodes that receive the message to:
      determine whether to adjust their respective transmission rates based on the source and the reason for the congestion included in the message, and
      transmit another message to one or more other nodes including the source and the reason for the congestion of the access point.

2. A method as claimed in claim 1, further comprising:
   when the access point determines that congestion exists, operating the access point to determine the reason for the congestion.

3. A method as claimed in claim 2, wherein:
   the step of operating the access point to determine the reason for congestion comprises operating the access point to determine whether the congestion is caused by a characteristic of a link between the access point and one of the nodes or traffic among a plurality of nodes neighboring the access point.

4. A method as claimed in claim 1, wherein:
   when the access point determines that the congestion no longer exists, operating the access point to transmit a message including information indicating an absence of congestion.

5. A method as claimed in claim 1, wherein:
   the step of operating those nodes that receive the message comprises operating those nodes to lower their respective transmission rates for transmissions to the access point.

6. A method for operating a node in a wireless communication network to assess congestion, the method comprising:
   operating the node to evaluate an amount of traffic that the node is receiving and an amount of traffic that the node is transmitting;
   operating the node to determine whether congestion exists at the node based on the evaluated amounts of received and transmitted traffic; and
   when the node determines that congestion exists, operating the node to determine a source and a reason for the congestion, and to transmit a message including information pertaining to the congestion and the source and the reason for the congestion to the source of the congestion and further to one or more other nodes.

7. A method as claimed in claim 6, wherein:
   the step of operating the node to determine the reason for congestion comprises operating the node to determine whether the congestion is caused by a characteristic of a link between the node and another node in the network or traffic among other nodes neighboring the node.

8. A method as claimed in claim 6, wherein:
   when the node determines that the congestion no longer exists, operating the node to transmit a message including information indicating an absence of congestion.

9. A wireless communication network, comprising:
   a plurality of nodes; and
   at least one access point, operating to provide at least one of the nodes with access to another network;
   the access point further operating to evaluate an amount of traffic that the access point is receiving and an amount of traffic that the access point is transmitting, to determine whether congestion exists at the access point based on the evaluated amounts of received and transmitted traffic, and to transmit a message including a source and a reason for the congestion when the access point determines that congestion exists; and the nodes that receive the message operate to determine whether to adjust their respective transmission rates based on the source and the reason for the congestion included in the message, and further operate to transmit another message to one or more other nodes including to the source and the reason for the congestion of the access point.

10. A wireless communication network as claimed in claim 9, wherein:

the access point further determines the source and the reason for the congestion.

11. A wireless communication network as claimed in claim 10, wherein:

the access point further determines whether the congestion is caused by a characteristic of a link between the access point and one of the nodes or traffic among a plurality of nodes neighboring the access point.

12. A wireless communication network as claimed in claim 9, wherein:

the access point further transmits a message including information indicating an absence of congestion when the access point determines that the congestion no longer exists.

13. A wireless communication network as claimed in claim 9, wherein:

the nodes that receive the message further lower their respective transmission rates for transmissions to the access point.

* * * * *

UNITED STATES PATENT AND TRADEMARK OFFICE
CERTIFICATE OF CORRECTION

| | |
|---|---|
| PATENT NO. | : 7,733,766 B2 |
| APPLICATION NO. | : 11/260826 |
| DATED | : June 8, 2010 |
| INVENTOR(S) | : Ozer et al. |

It is certified that error appears in the above-identified patent and that said Letters Patent is hereby corrected as shown below:

In Column 4, Line 64, delete "(TAPs)" and insert -- (IAPs) --, therefor.

Signed and Sealed this
Thirty-first Day of July, 2012

David J. Kappos
*Director of the United States Patent and Trademark Office*